United States Patent

Okimoto

[11] Patent Number: 5,848,318
[45] Date of Patent: Dec. 8, 1998

[54] STATUS RESPONDING DEVICE FOR SUPPLYING STATUS INFORMATION RESPONSIVE TO STATUS TRANSMISSION REQUEST

[75] Inventor: Satoshi Okimoto, Komaki, Japan

[73] Assignee: Brother Kogyo Kabushiki Kaisha, Nagoya, Japan

[21] Appl. No.: 877,813

[22] Filed: Jun. 18, 1997

[30] Foreign Application Priority Data

Jun. 18, 1996 [JP] Japan .................................... 8-156976

[51] Int. Cl.⁶ .................................................. G03G 15/00
[52] U.S. Cl. ................................................. 399/8; 379/106
[58] Field of Search ........................... 399/8, 1; 379/106; 364/138

[56] References Cited

U.S. PATENT DOCUMENTS 5,369,471  11/1994  Yamada ........................................ 399/8
5,383,012   1/1995  Yamada ........................................ 399/8
5,512,979   4/1996  Ogura ........................................... 399/8

Primary Examiner—R. L. Moses
Attorney, Agent, or Firm—Oliff & Berridge PLC

[57] ABSTRACT

Even when a printer is in a condition incapable of receiving commands from a personal computer (PC), a status responding mode can be switched to ON in accordance with a request from the PC, thereby allowing detailed status information of the printer to be transmitted to the PC. When a printer is in an error condition when it is powered or reset, the printer rejects reception of data on a data line. Therefore, the mode of the printer cannot be changed with a set command transmitted from the PC to the printer through the data line. In view of the fact that the printer is capable of receiving signals on control lines even if the printer is in the error condition, the PC outputs a status transmission request through the select-in line for a predetermined number of times, so that a status transmission request interrupt process can be executed and then a parameter DEVICE is set to ON. Thereafter, the PC is capable of gathering detailed status information of the printer by merely transmitting the status transmission request to the printer.

20 Claims, 5 Drawing Sheets

STATUS RESPONDING DEVICE FOR SUPPLYING STATUS INFORMATION RESPONSIVE TO STATUS TRANSMISSION REQUEST

BACKGROUND OF THE INVENTION

1. Field of the Invention

The present invention relates to a status responding device provided in a data processing device, such as a printer, wherein a status of the data processing device is transmitted to an external device through a data line or a control line in response to a request from the external device requesting to send the status information.

2. Description of the Prior Art

A personal computer (hereinafter referred to as "PC") is one of the typical data processing devices. A printer is typically connected to the PC to print data transmitted from the PC. When the printer operates normally, it prints data transmitted from the PC through data lines under a predetermined shake-hands processing implemented through control lines. When an error occurs in the printer, such as no paper, or paper jam, the printer notifies the PC of the occurrence of the error by reversing the level of a voltage on the control line and then rejects data reception through the data lines. Thus, the printing job is stopped.

Recent printers are provided with a function to transmit detailed status information regarding the status of the printer to the PC. This is because notifying the PC of the occurrence of the error is not sufficient for an operator to solve the problem. The status information is transmitted from the printer to the PC in the form of code data through the data line or a plurality of control lines when a status transmission request is made through the control line by the PC.

The PC receives the status information from the printer and decodes the status information to develop it into a message. The message is displayed on a display device, such as a CRT, to thereby notify the operator of the status of the printer. In order to receive and display the status of the printer at the PC, it is necessary that a bi-directional communication between the PC and the printer is possible. However, all the PCs currently used in the world are not capable of bi-directional communication between the PC and the printer. In the cases where the PC with no bi-directional communication capability is connected to the printer provided with a status information transmission capability, it is of no use to store and accumulate the status information at the printer side. If a large amount of status information remains untransmitted in the printer, problems will occur in the printer, such as overflow of the data.

In view of the foregoing, the printers with the status information transmission capability have an ON/OFF switch that allows a status responding mode to be switched between ON and OFF. When the status responding mode is switched to ON by the ON/OFF switch, then the status transmission will be performed whereas when the status responding mode is switched to OFF by the ON/OFF switch, then the status transmission will not be performed. The PC is capable of remotely controlling the ON/OFF switch by sending a set command to the printer. Therefore, even if a PC with the bi-directional communication capability is connected to a printer in which the status responding mode has been set to OFF, the status responding mode of the printer can be switched to ON by the transmission of the set command to the printer through the data line. Under this condition, when the printer receives the status transmission request from the PC, then the printer transmits its status information to the PC.

When a printer in which the status responding mode has been set to OFF is in an error condition due to, for example, cover open at a time when the printer is powered or reset, the printer receives neither data nor commands through the data lines. In such a condition, the status responding mode of the printer cannot be remotely controlled. As a result, even if the status transmission request is issued from the PC, no response is available from the printer.

As described, detailed error information of the printer may not be available at the side of the PC. In the absence of such information, it takes time to recover the printer. Although LEDs provided on the printer alert the operator of the occurrence of an error, detailed error information is not taught from lighting of the LEDs.

When the status responding mode of the printer has been set to ON at the time of powering or resetting, the printer updates the status information each time the status of the printer changes so that the updated status information can be transmitted immediately to the PC if requested. If the PC connected to such a printer is of the type in which the bi-directional communication cannot be performed, i.e., of the one-way communication type, the status information stored in a transmission buffer overflows because the status information is not read out by the PC.

SUMMARY OF THE INVENTION

The present invention has been made to solve the above mentioned problems, and accordingly it is an object of the present invention to provide a status responding device wherein pursuant to a request from a PC, a status responding mode in a printer is switched to ON, thereby allowing detailed status information to transmit from the printer to the PC even if the printer is in a condition incapable of receiving commands from the PC.

To achieve the above and other objects, there is provided a status responding device provided in a data processing device that is connectable to an external device. The status responding device according to one aspect of the invention includes counting means, mode setting means, status information producing means, and outputting means. The mode setting means automatically sets the status responding mode to AUTO when the data processing device is powered. When the data processing device is operating normally, the external device can remotely set the status responding mode to one of ON, OFF and AUTO. However, when the data processing device is in an error condition and rejects reception of a set command for setting the status responding mode, the status responding mode cannot be changed by the set command. According to the present invention, to set the status responding mode to ON, the external device sends a status transmission request for predetermined times. The counting means counts the number of times the status transmission request is received from the external device and outputs a count-up signal when the status transmission request is received for the predetermined number of times. The mode setting means sets a status responding mode to ON in response to the count-up signal. That is, even when the data processing device is in the error condition, the status responding mode can be set to ON if the external device sends out the status transmission request for the predetermined number of times. The status information producing means produces status information on a status of the data processing device after the status responding mode is set to ON. The outputting means then outputs the status information to the external device in response to the status transmission request from the external device. Therefore, the external device can gather the status information of the data processing device even if it does not respond to the set command.

Status information checking means is further provided for checking whether the status information is present. The outputting means outputs the status information to the external device when the status information checking means indicates that the status information is present.

Only when the status responding mode is AUTO, the counting means counts the number of times the status transmission request is received from the external device and the mode setting means changes the status responding mode from AUTO to ON when the count-up signal is output from the counting means. The mode setting means further sets the status responding mode to OFF. In this case, the status information producing means does not produce the status information.

Preferably, the data processing device is an image forming device having data receiving means for receiving data from the external device. The image forming device forms an image based on the data received from the external device.

According to another aspect of the invention, there is provided a status responding device provided in a data processing device that is connectable to an external device through control lines and data lines. The status responding device includes status information producing means, status information storing means, counting means, and outputting means. The status information producing means produces status information on a status of the data processing device. The status information storing means stores the status information produced by the status information producing means. When the data processing device is in an error condition and rejects reception of a set command sent out from the external device for setting a status responding mode, the external device sends a status transmission request for a predetermined number of times. Then, the counting means counts the number of times the status transmission request is received from the external device through the control liens and outputs a count-up signal when the status transmission request is received for the predetermined number of times. The outputting means outputs the status information stored in the status information storing means to the external device through at least one of the control lines and the data lines. The status information producing means produces the status information when the count-up signal is output from the counting means, whereupon the outputting means outputs the status information to the external device in response to a subsequently received status transmission request.

Mode setting means is further provided for setting a status responding mode to at least one of AUTO and ON. When the status responding mode is AUTO, the mode setting means changes the status responding mode from AUTO to ON when the count-up signal is output from the counting means. When the status responding mode is ON, the status information producing means produces the status information, whereupon the outputting means outputs the status information to the external device in response to the subsequently received status transmission request. The mode setting means further sets the status responding mode to OFF. When the status responding mode is OFF, the outputting means does not output the status information to the external device even if the status transmission request is received from the external device.

Sensing means is further provided for sensing the status of the data processing device and outs a detection signal. The status information producing means produces the status information based on the detection signal. The sensing means senses the status of the data processing device at every predetermined interval when the status responding mode is set to AUTO or ON. However, the sensing means does not sense the status of the data processing device when the status responding mode is set to OFF.

Erasing means is further provided for erasing the status information stored in the status information storing means whenever the outputting means outputs the status information stored in the status information storing means to the external device. When the status information is not stored in the status information storing means as a result of erasing by the erasing means, the outputting means does not output the status information.

Incidentally, a count number counted by the counting means is cleared when the data processing means is powered or reset.

When the data processing device is operating normally, the mode setting means changes the status responding mode to ON when the set command is received from the external device through the data lines. In this case, the status information producing means produces the status information when the status responding mode is set to ON and the outputting means outputs the status information in response to the status transmission request. The status information stored in the status information storing means is erased whenever the outputting means outputs the status information stored in the status information storing means to the external device. The outputting means outputs the status information only when the status information exists in the status information storing means.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENT

A preferred embodiment of the present invention will be described while referring to the accompanying drawings.

Figure 1:
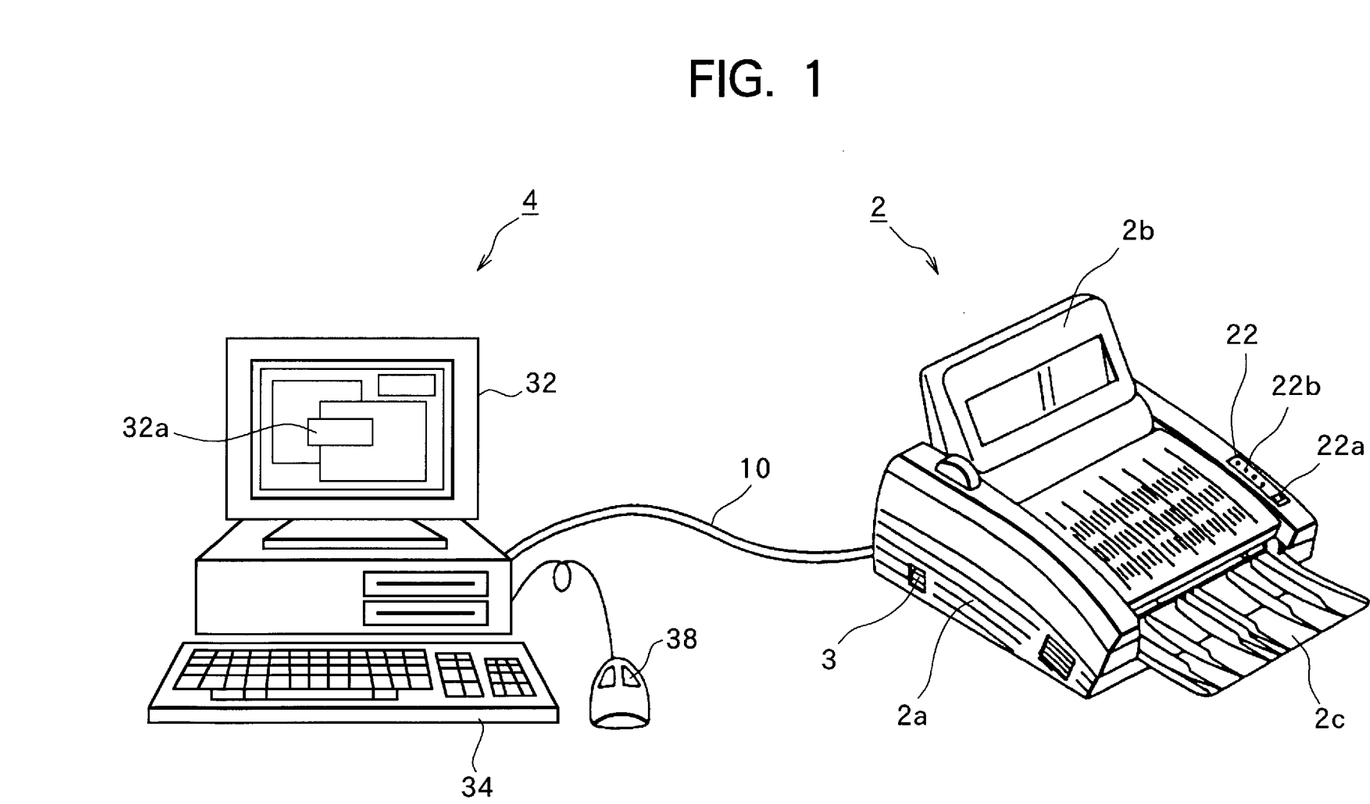
FIG. 1 is a perspective view showing a laser printer connected to a PC.
Figure 2:
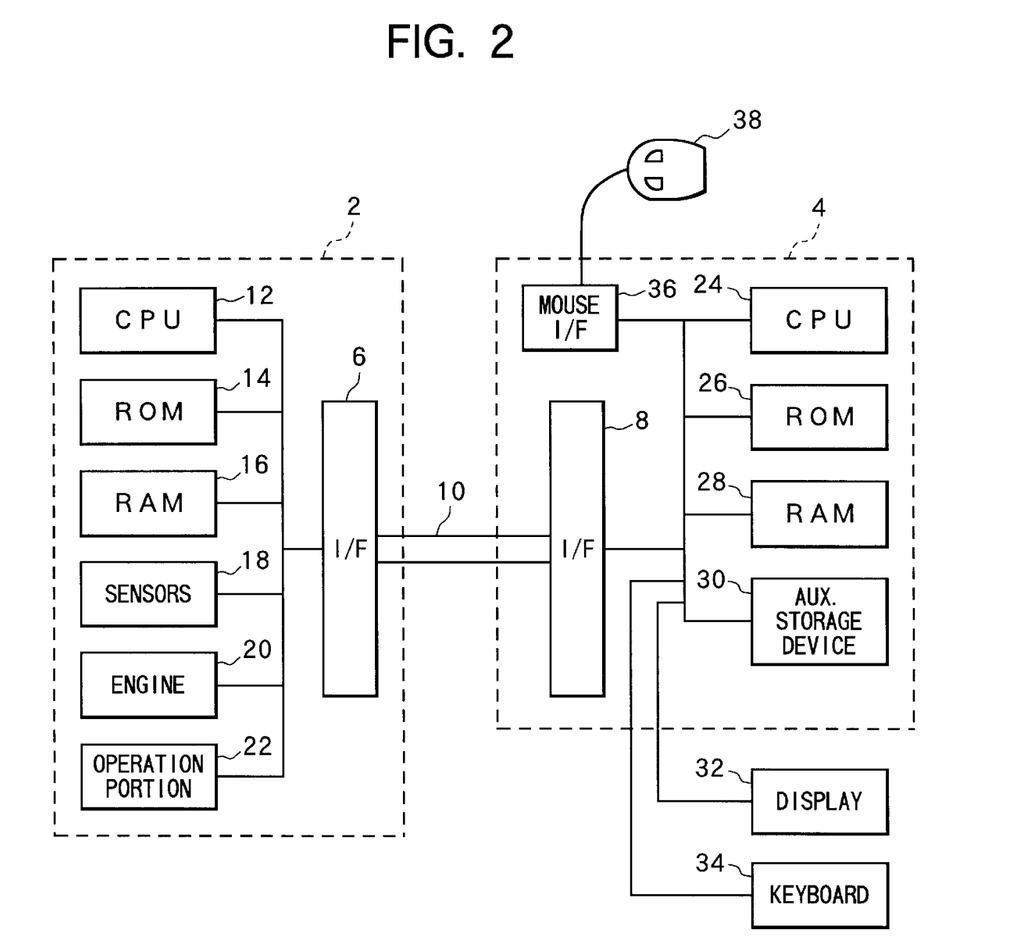
FIG. 2 is a block diagram showing electrical arrangements of the laser printer and the PC shown in FIG. 1.

FIG. 1 shows a condition in which a laser printer 2 is connected to a PC 4. FIG. 2 is a block diagram showing electrical arrangements of the laser printer 2 and the PC 4. Both the laser printer 2 and the PC 4 have interfaces 6 and 8, respectively, which comply with the standards of IEEE (Institute of electrical and electronics Engineers) 1284. The interfaces 6 and 8 are mutually connected by a cable suitable for the IEEE1284.

The laser printer 2 includes a CPU (central processing unit) 12, a ROM (read-only memory, 14, a RAM (random access memory) 16, sensors 18, a printer engine 20, and an operation portion 22. The CPU 12 executes various controls in accordance with programs stored in the ROM 14. The RAM 16 is used as a working area when the CPU 12 executes operations. The RAM 16 also stores the operation results transferred from the CPU 12 and also various setting conditions. The sensors include paper feed sensor, paper discharge sensor, toner sensor and the like. The printer engine 20 is a main motor for driving mechanical components of the laser printer 2. The operation portion includes push button switch 22a for entering an instruction to the printer, and LEDs (light emitting diodes) 22b which indicate instructions for setting prescribed conditions or instructed conditions. A power switch 3 is provided on the side wall of a printer body 2a.

The PC 4 includes a CPU 24, a ROM 26, a RAM 28, an auxiliary storage device 30, a display 32, a keyboard 34, a mouse interface 36, and a mouse input device 38. The CPU 24 executes various controls in accordance with programs stored in the ROM 26. The RAM 28 temporarily stores an OS (operating system) read from the auxiliary storage medium provided in the auxiliary storage device 30, programs, such as application softwares and device drivers, data or operation results transferred from the CPU 24, and various setting conditions. The auxiliary storage device 30 is used to input programs or data into the PC from various auxiliary storage mediums, such as floppy disks, optomagnetic disks, CD-ROMS. The display 32 displays operation results, menu, status of the laser printer 2 when it carries out printing. The keyboard 34 is an input device for entering data or instructions according to operator's manipulations. The mouse input device 38 moves a mouse cursor displayed on the display 32 through the mouse interface 36 and is used to enter instructions to the PC 4.

The laser printer 2 is provided with a paper feeder 2b at the rear upper portion of the printer body 2a. In use, sheets of paper stored in the paper feeder 2b are fed into an image forming section one by one. The sheet of paper on which a tone image is transferred is passed through a thermal fixing section where the toner image is thermally fixed to the sheet of paper and the printed paper is discharged out on a discharge tray 2c.

Figure 3:
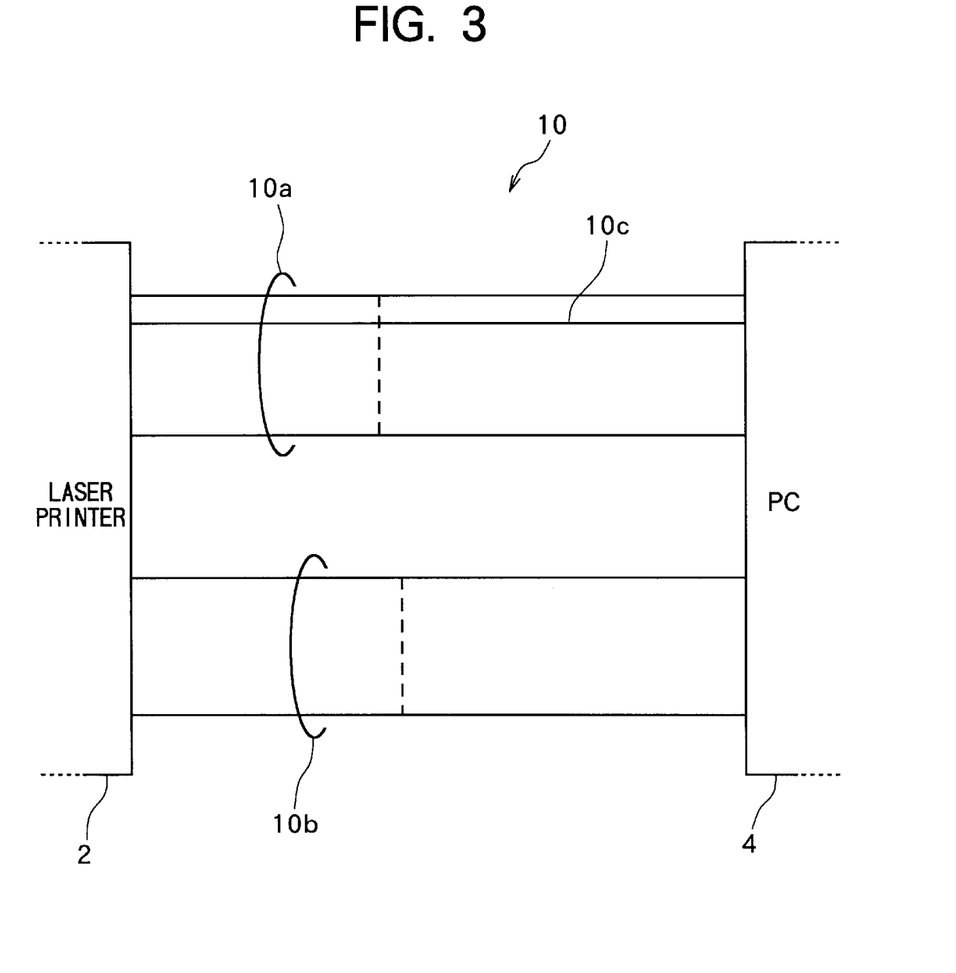
FIG. 3 is an explanatory diagram showing cables connecting the laser printer and the PC.

The PC 4 and the laser printer 2 exchange a strobe signal and acknowledge signal through control lines 10 shown in FIG. 3 for the sake of shake-hands processing. The PC 4 transfers data and commands through data lines 10b to the laser printer 2, and the printer 2 carries out printing and switches a status responding mode based on the data and commands transferred from the PC 4.

When the status responding mode in the laser printer 2 is set to ON, the printer 2 sends out status information to the PC 4 through the data lines 10b in response to a status transmission request received from the PC 4. The PC 4 creates the request by reversing the level of a voltage on a select-in line constituting the control lines 10. The status information sent out from the printer 2 represents a status of the printer 2.

Figure 4:
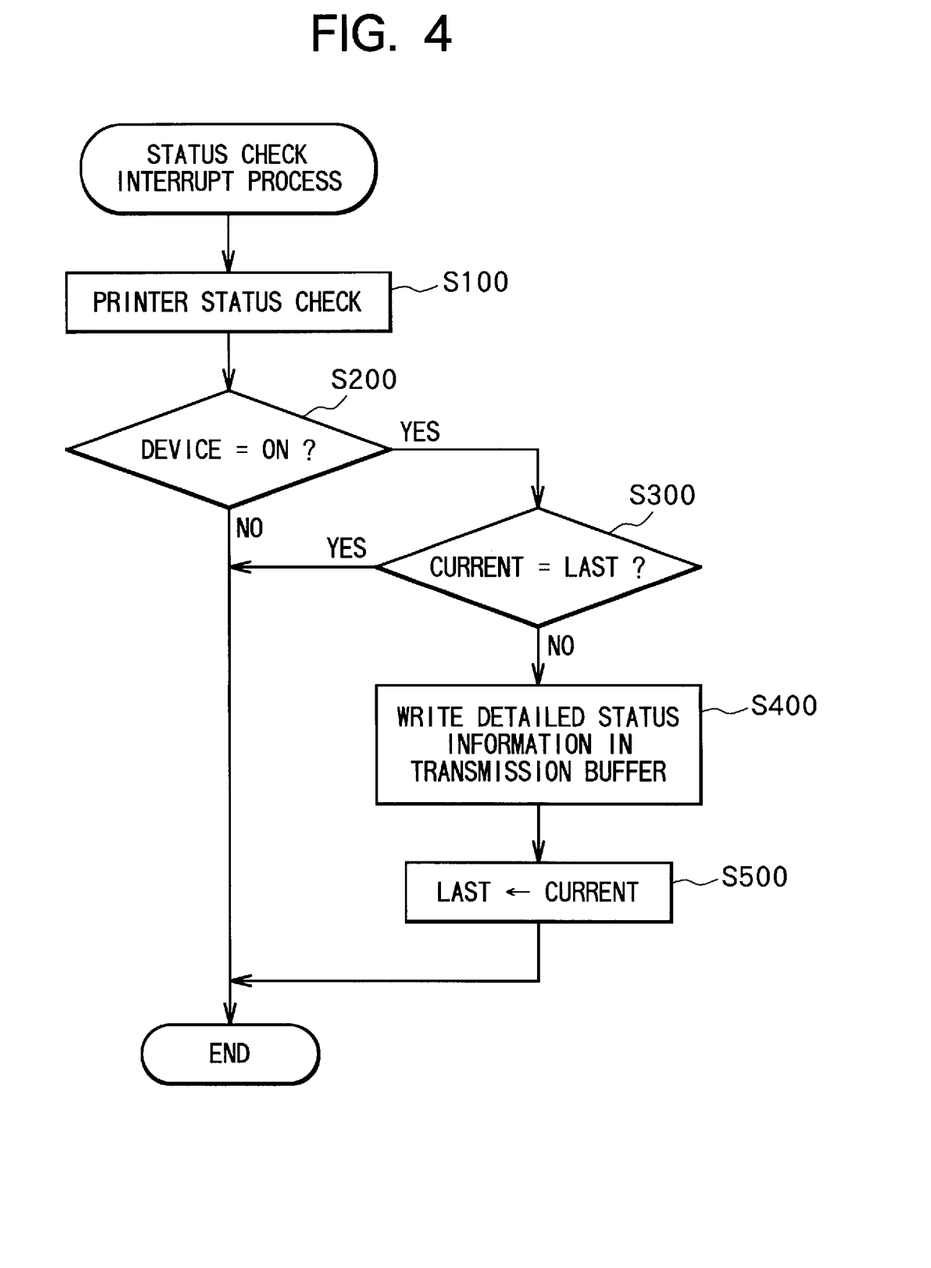
FIG. 4 is a flowchart illustrating a status check interrupt process run at every 50 ms in accordance with an embodiment of the present invention.
Figure 5:
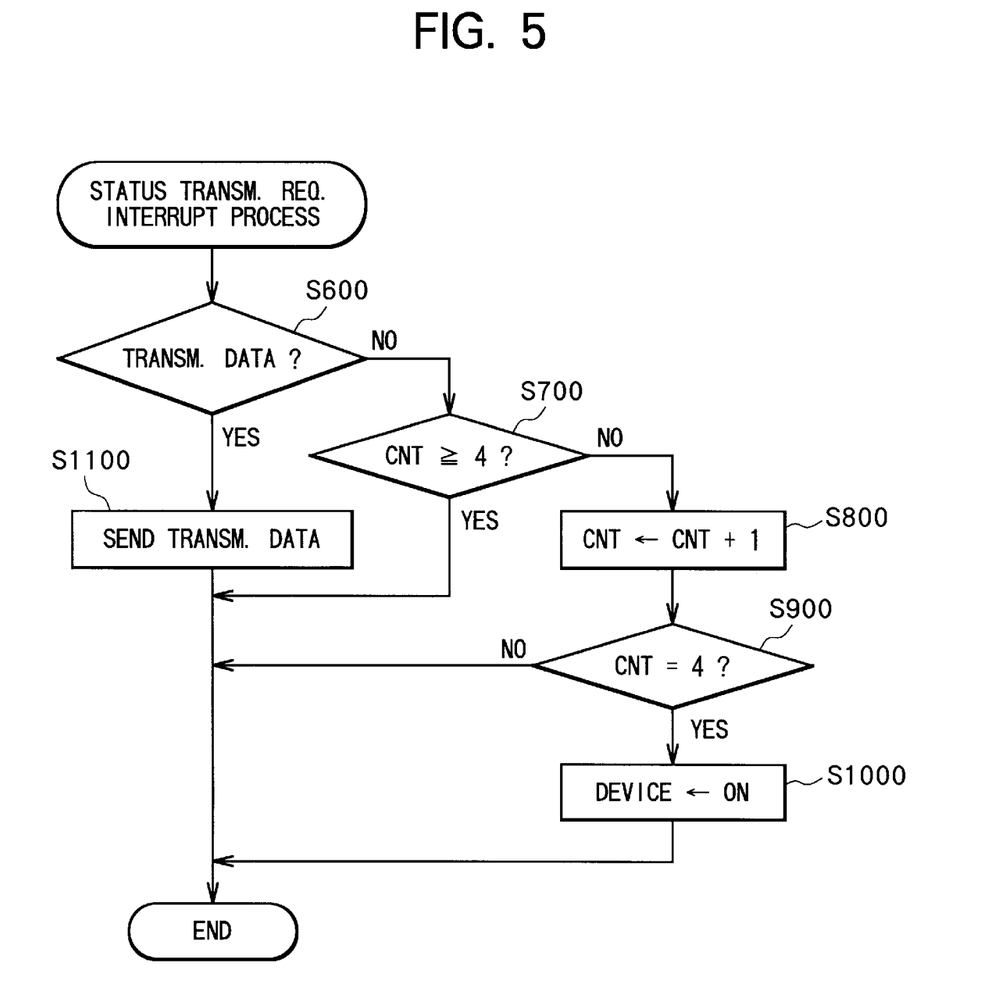
FIG. 5 is a flowchart illustrating an status transmission request interrupt process which is run in accordance with a status transmission request from the PC.

FIG. 4 describes a status check interrupt process implemented by the laser printer 2 at every 50 ms, and FIG. 5 describes a status transmission request interrupt process implemented by the laser printer 2. The latter process is implemented in response to the status transmission request sent from the PC 4 when the status responding mode in the printer 2 is set to "ON".

A backup RAM is provided in the RAM 16 of the laser printer 2. A set condition of the status responding mode is stored in a predetermined location in the backup RAM as a parameter "DEVICE". The status responding mode (DEVICE) is set to either one of "ON", "OFF" and "AUTO".

When the status responding mode is "ON" (DEVICE: ON), implementation of both the status check interrupt process and the status transmission request interrupt process are permitted. When the status responding mode is "OFF" (DEVICE: OFF), implementation of the status check interrupt process and the status signal transmission interrupt process is prevented and so these two processed are not implemented. When the status responding mode is "AUTO" (DEVICE: AUTO), implementation of both the status check interrupt process and the status transmission request interrupt process are permitted. The status responding mode (DEVICE) can be set to either one of "ON", "OFF" and "AUTO" based on a set command transmitted form the PC 4 through the data lines 10b. When the status responding mode has been set to "AUTO", the mode can be changed to "ON" by the status transmission request output from the PC 4.

When the laser printer 2 is powered or reset, the status responding mode is automatically set to "AUTO" as a result of the initial setting process implemented by the CPU 12 of the laser printer 2. After the laser printer 2 is powered or reset, the status check interrupt process shown in FIG. 4 is implemented at every 50 ms. The status transmission request interrupt process shown in FIG. 5 is run when the status transmission request is received from the PC 4.

Next, the status check interrupt process will be described while referring to the flowchart of FIG. 4.

When this process is commenced, the printer status is checked (S100). In the following description, Si represents step number where i is a number equal to or greater than 100. Based on the outputs from the various sensors 18, the status of the printer 2 is checked to determine if the printer 2 is in a condition of "ready", "print", "wait", "sleep", "cover open", "paper jam", "no paper" or the like.

Next, determination is made as to whether the parameter "DEVICE" is set to "ON" or not (S200). As described above, just after the laser printer 2 is powered or reset, the status responding mode in the printer 2 has been set to "AUTO". Hence, the parameter "DEVICE" is "AUTO" (S200: NO). Accordingly, the status check interrupt process is temporarily ended. As far as the parameter "DEVICE" remains in "AUTO", the decision made in S200 will be "NO" in the subsequent interrupt process implemented at every 50 ms. In such a situation, process other than in S100 is not implemented.

When the PC 4 sends out the status transmission request to the laser printer 2, the status transmission request interrupt process shown in FIG. 5 is implemented. The status transmission request is made by reversing the voltage on the select-in (Selin) line 10c.

In the flowchart shown in FIG. 5, it is first determined whether or not transmission data exists in a transmission buffer assigned in the RAM 16 (S600). Just after the laser printer 2 is powered or reset, the contents of the transmission buffer are cleared through the initial setting process, and so there is no transmission data in the transmission buffer (S600: NO). Next, it is determined whether or not a value in a counter CNT, which is assigned in the RAM 16, is more than "4" (S700). Just after the laser printer 2 is powered or reset, the counter CNT is reset (CNT=0) through the initial setting process. Therefore, the determination made in S700 is "NO". In S800, the counter CNT is incremented by one.

When the counter value is zero (CNT=0), it is incremented to 1 (CNT=1). In S900, it is determined if CNT=4. When CNT=4 is not met (S900: NO), the status transmission request interrupt process is temporarily ended.

If two more status transmission requests are thereafter issued from the PC4, S600, S700, S800 and S900 are repeatedly executed, with the result that the counter value becomes "3" (CNT=3). When the PC 4 further issues the status transmission request, then determinations made in S600 and S700 turns to "NO", and the counter value is incremented to "4" (CNT=4) in S800. As a result, the determination made in S900 is "YES", so that the parameter "DEVICE" is set to "ON" (S1000). That is, the status responding mode is thereby switched from "AUTO" to "ON".

In the status check interrupt process executed after S1000, determination made in S200 becomes "YES". Then, in S300, it is determined whether the current status of the printer is in coincidence with the last status of the printer which was previously sent to PC 4 as the status information. More specifically, a code "CURRENT" representing the current status of the printer is compared with a code "LAST" representing the last status of the printer. The code "CURRENT" is written based on information on the current status of the printer gathered in the step of the printer status check (S100). When S300 is first executed after the laser printer 2 is powered or reset, no information is written in the code "LAST" (S300: NO). Then, detailed information on the status of the printer is written in the transmission buffer based on the contents in the code "CURRENT" (S400). The detailed information written in the transmission buffer may either be the same contents as in the code "CURRENT" or be contents converted to a predetermined format. The contents i the code "CURRENT" are copied to the code "LAST" (S500), whereupon the routine is temporarily ended.

If the status transmission request is received from the PC 4 before completion of S400, that is, before the detailed information on the status of the printer is written in the transmission buffer, then determination made in S600 in the flowchart shown in FIG. 5 is "NO". However, because the counter value is "4" (CNT=4), the determination made is S700 is "YES", whereupon the status transmission request interrupt process is temporarily ended.

When the detailed information on the status of the printer has already been written in the transmission buffer in S400, determination made in S600 becomes "YES". Then, the detailed status information in the transmission buffer is transmitted to the PC 4 through the data lines 10b (S1100). The detailed status information stored i the transmission buffer is erased upon transmission.

Through the above-described process, regardless of whether the laser printer 2 is in an error or normal condition at the time when it is powered or reset, the PC 4 is capable of gathering the detailed status information of the printer. Specifically, when the laser printer 2 is not in an error condition at the time when it is powered or reset, the set command is sent to the laser printer 2 from the PC 4 through the data lines 10b. The status responding mode in the laser printer 2 is thereby set to "ON" (DEVICE: ON). As a result, the detailed status information gathered through the status check interrupt process is written in the transmission buffer and the detailed status information stored therein is transmitted to the PC 4 in the status transmission request interrupt process that is implemented in response to the status transmission request.

When the laser printer 2 is in the error condition at the time when the printer 2 is powered or reset, the printer 2 rejects receiving the commands or data on the data lines 10b. Therefore, the status of the laser printed 2 cannot be changed by the set command. However, because the laser printer 2 is capable of receiving signals on the control lines 10a even if the printer 2 is in the error condition, S1000 in the status transmission request interrupt process is executable if the status transmission request is repeatedly outputted from the PC 4 through the select-in line 10c. When the status transmission request is outputted for a predetermine number of times, four in this embodiment, the parameter "DEVICE" is set to "ON". That is, "AUTO" in the status responding mode in the printer 2 is switched to "ON". As a result, the PC is capable of obtaining the detailed status information of the laser printer 2. This can be done by merely transmitting the status transmission request to the printer 2 for the predetermined number of times.

Therefore, not only in the case where the laser printer 2 is not in the error condition but also in the case where the printer 2 is in the error condition, the PC 4 can gather the detailed status information of the printer, thereby allowing the operator to perform relevant operations. In the status check interrupt process executed at every 50 ms, the detailed information on the status of the printer is not written in the transmission buffer as far a the status of the printer 2 does not change relative to the latest status of the printer 2 (S300: YES). In this case, the PC 4 does not transmit the detailed information to the PC 4 even if the status transmission request is received from the PC 4. The detailed information on the status of the printer is not written in the transmission buffer. As a result, determination made in S600 in the status transmission request interrupt process is "NO" and determination made in S700 is "YES", whereupon the routine is temporarily ended. Through the above-described processings, the detailed status information of the printer 2 is not transmitted to the PC 4.

When the detailed status information is transmitted to the PC 4 in response to the status transmission request, the PC 4 displays the transmitted contents on the associated display 32 so that the operator can see the status of the printer 2. When updated detailed status information is subsequently transmitted to the PC 4 in response to the subsequently issued status transmission request, the displayed contents are replaced with the updated status information. When the detailed status information is not available in spite of issuance of the status transmission request from the PC 4, the status of the printer 2 remains the same. In this manner, the detailed status information of the printer 2 can be given to the operator at real time.

When the PC 4 is of the type in which the bi-directional communication cannot be made between the PC 4 and the printer 2, that is when the PC 4 is incapable of receiving the detailed status information from the printer 2 through the data lines 10b, such type of PC 4 will not output the status transmission request to the printer 2 after the printer 2 is powered or reset. Thus, the status transmission request interrupt process shown in FIG. 5 will not be implemented, so that the counter value stands zero (0), i.e., CNT=0, and accordingly the parameter "DEVICE" will not turn to "ON". As such, the status responding mode of the laser printer 2 stays in "AUTO".

When the parameter "DEVICE" is "AUTO", determination made in S200 is "NO" even if the status check interrupt process is implemented. S400 will not be executed, so the detailed status information will not be written in the transmission buffer. Accordingly, even if the PC 4 that is incapable of establishing the bi-directional communication is connected to the printer 2, the detailed status information will not be stored in the transmission buffer. Overflow of the transmission buffer will therefore not occur.

For the PC 4 having a capability of performing the bi-directional communication, the status responding mode of the laser printer 2 can be remotely controlled when the printer 2 is recovered form the error condition. Because the laser printer 2 is capable of receiving the set command through the data lines 10b, the set command issued from the PC 4 can render the mode setting process of the printer 2 operate. The status responding mode (parameter "DEVICE") of the printer can be switched to "OFF" so as not to perform the status check interrupt process and the status transmission request interrupt process. Also, the status responding mode can be changed to "ON" or "AUTO".

While only one exemplary embodiment of this invention has been described in detail, those skilled in the art will recognize that there are many possible modifications and variations which may be may in this exemplary embodiment while yet retaining many of the novel features and advantages of the invention. Accordingly, all such modifications and variations are intended to be included within the scope of the appended claims.

The above-described embodiment is directed to a so-called "byte mode bi-directional communication" wherein the detailed status information is transmitted from the laser printer 2 to the PC 4 through eight data lines 10b. Instead of this, a so-called "nibble mode bi-directional communication" may be employed wherein 1 byte code is transmitted from the laser printer 2 to the PC 4 using four control lines 10a and in two separate phases.

What is claimed is:

1. A status responding device provided in a data processing device that is connectable to an external device, said status responding device comprising:
    counting means for counting a number of times a status transmission request is received from the external device and for outputting a count-up signal when the status transmission request is received for a predetermined number of times;
    mode setting means for setting a status responding mode to ON in response to the count-up signal;
    status information producing means for producing status information on a status of the data processing device after the status responding mode is set to ON; and
    outputting means for outputting the status information to the external device in response to the status transmission request from the external device.

2. The status responding device according to claim 1, further comprising status information checking means for checking whether the status information is present, and wherein said outputting means outputs the status information to the external device when said status information checking means indicates that the status information is present.

3. The status responding means according to claim 2, wherein said mode setting means sets the status responding mode to at least one of AUTO and ON, wherein only when the status responding mode is AUTO, said counting means counts the number of times the status transmission request is received from the external device and said mode setting means changes the status responding mode from AUTO to ON when the count-up signal is output from said counting means.

4. The status responding device according to claim 3, wherein said mode setting means further sets the status responding mode to OFF, wherein when the status responding mode is OFF, said status information producing means does not produce the status information.

5. The status responding device according to claim 4, wherein when the data processing means receives a set command from the external device, said mode setting means sets the status responding mode to one of ON, OFF and AUTO.

6. The status responding device according to claim 5, wherein said mode setting means automatically sets the status responding mode to AUTO when the data processing device is powered.

7. The status responding device according to claim 1, wherein the data processing device is an image forming device having data receiving means for receiving data from the external device, said image forming device forming an image based on the data received from the external device.

8. A status responding device provided in a data processing device that is connectable to an external device through control lines and data lines, said status responding device comprising:
    status information producing means for producing status information on a status of the data processing device;
    status information storing means for storing the status information produced by said status information producing means;
    counting means for counting a number of times a status transmission request is received form the external device through the control lines and for outputting a count-up signal when the status transmission request is received for a predetermined number of times; and
    outputting means for outputting the status information stored in said status information storing means to said external device through at least one of the control lines and the data lines,
    wherein said status information producing means produces the status information when the count-up signal is output from said counting means, whereupon said outputting means outputs the status information to said external device in response to a subsequently received status transmission request.

9. The status responding device according to claim 8, further comprising mode setting means for setting a status responding mode to at least one of AUTO and ON, wherein when the status responding mode is AUTO, said mode setting means changes the status responding mode form AUTO to ON when the count-up signal is output from said counting means, and wherein when the status responding mode is ON, said status information producing means produces the status information, whereupon said outputting means outputs the status information to said external device in response to the subsequently received status transmission request.

10. The status responding device according to claim 9, wherein said mode setting means further sets the status responding mode to OFF, wherein when the status responding mode is OFF, said outputting means does not output the status information to said external device even if the status transmission request is received form the external device.

11. The status responding device according to claim 10, further comprising sensing means for sensing the status of the data processing device and outputting a detection signal, wherein said status information producing means produces the status information based on the detection signal.

12. The status responding device according to claim 11, wherein said sensing means senses the status of the data processing device at every predetermined interval when the status responding mode is set to AUTO or ON.

13. The status responding device according to claim 12, wherein said sensing means does not sense the status of the data processing device when the status responding mode is set to OFF.

14. The status responding device according to claim 8, further comprising erasing means for erasing the status information stored in said status information storing means whenever said outputting means outputs the status information stored in said status information storing means to said external device.

15. The status responding device according to claim 14, wherein when the status information is not stored in said status information storing means as a result of erasing by said erasing means, said outputting means does not output the status information.

16. The status responding device according to claim 8, wherein a count number counted by said counting means is cleared when the data processing means is powered or reset.

17. The status responding device according to claim 9, wherein said mode setting means changes the status responding mode to ON when a set command is received from the external device through the data lines.

18. The status responding device according to claim 17, wherein said status information producing means produces the status information when the status responding mode is set to ON and said outputting means outputs the status information in response to the status transmission request.

19. The status responding device according to claim 18, further comprising erasing means for erasing the status information stored in said status information storing means whenever said outputting means outputs the status information stored in said status information storing means to said external device.

20. The status responding device according to claim 18, wherein said outputting means outputs the status information when the status information exists in said status information storing means.

* * * * *